United States Patent
Hoshina et al.

(10) Patent No.: US 10,411,250 B2
(45) Date of Patent: Sep. 10, 2019

(54) NONAQUEOUS ELECTROLYTE BATTERY, BATTERY PACK, AND VEHICLE

(71) Applicant: Kabushiki Kaisha Toshiba, Minato-ku (JP)

(72) Inventors: Keigo Hoshina, Kashiwazaki (JP); Yasunobu Yamashita, Tokyo (JP); Yoshiyuki Isozaki, Tokyo (JP); Norio Takami, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 159 days.

(21) Appl. No.: 15/691,966

(22) Filed: Aug. 31, 2017

(65) Prior Publication Data
US 2018/0026260 A1    Jan. 25, 2018

Related U.S. Application Data (63) Continuation of application No. PCT/JP2015/076071, filed on Sep. 14, 2015.

(51) Int. Cl.
*H01M 4/36* (2006.01)
*H01M 4/505* (2010.01)
(Continued)

(52) U.S. Cl.
CPC ............ *H01M 4/364* (2013.01); *H01M 2/34* (2013.01); *H01M 4/131* (2013.01); *H01M 4/136* (2013.01);
(Continued)

(58) Field of Classification Search
CPC ...... H01M 4/505; H01M 4/525; H01M 4/364; H01M 2004/028
See application file for complete search history.

(56) References Cited

U.S. PATENT DOCUMENTS

2004/0110063 A1    1/2004  Uchitomi et al.
2006/0199080 A1    9/2006  Amine et al.
(Continued)

FOREIGN PATENT DOCUMENTS

EP    2 357 693 A1    8/2011
JP    2005-302507    10/2005
(Continued)

OTHER PUBLICATIONS

International Search Report dated Dec. 8, 2015 in PCT/JP2015/076071 filed Sep. 14, 2015 (w/English translation).
(Continued)

*Primary Examiner* — Matthew J Merkling
(74) *Attorney, Agent, or Firm* — Oblon, McClelland, Maier & Neustadt, L.L.P.

(57) ABSTRACT

According to one embodiment, a nonaqueous electrolyte battery including a negative electrode, a positive electrode, and a nonaqueous electrolyte is provided. The negative electrode contains a negative electrode active material. The positive electrode contains a positive electrode active material. The negative electrode active material contains a titanium-containing composite oxide. The positive electrode active material contains secondary particles of a first composite oxide and primary particles of a second composite oxide. The first composite oxide is represented by a general formula $LiMn_{1-x-y}Mg_xFe_yPO_4$ ($0<x\leq0.1$, $0<y\leq0.3$). The second composite oxide is represented by a general formula $LiCo_{1-a-b}Ni_aMn_bO_2$ ($0\leq a$, $b\leq0.5$).

11 Claims, 5 Drawing Sheets (51) Int. Cl.
  *H01M 4/525* (2010.01)
  *H01M 2/34* (2006.01)
  *H01M 4/131* (2010.01)
  *H01M 4/136* (2010.01)
  *H01M 4/58* (2010.01)
  *H01M 4/485* (2010.01)
  *H01M 10/0525* (2010.01)

(52) U.S. Cl.
  CPC ........... *H01M 4/485* (2013.01); *H01M 4/505* (2013.01); *H01M 4/525* (2013.01); *H01M 4/5825* (2013.01); *H01M 10/0525* (2013.01); *H01M 2220/20* (2013.01); *Y02E 60/122* (2013.01); *Y02T 10/7011* (2013.01)

(56) References Cited

U.S. PATENT DOCUMENTS

| | | | |
|---|---|---|---|
| 2009/0029249 A1 | 1/2009 | Takami et al. | |
| 2010/0285366 A1 | 11/2010 | Endoh | |
| 2011/0223482 A1 | 9/2011 | Fujii et al. | |
| 2012/0052299 A1 | 3/2012 | Fan et al. | |
| 2013/0095385 A1* | 4/2013 | Tran | C01G 23/005 |
| | | | 429/221 |
| 2013/0140496 A1* | 6/2013 | Nuspl | C01B 25/45 |
| | | | 252/507 |
| 2014/0027679 A1 | 1/2014 | Kim et al. | |
| 2014/0045069 A1 | 2/2014 | Numata et al. | |
| 2014/0356720 A1* | 12/2014 | Nuspl | C01B 25/45 |
| | | | 429/224 |
| 2015/0099159 A1 | 4/2015 | Hoshina et al. | |

FOREIGN PATENT DOCUMENTS

| | | |
|---|---|---|
| JP | 2008-115075 | 5/2008 |
| JP | 2008-532248 | 8/2008 |
| JP | 2009-21134 | 1/2009 |
| JP | 2010-262826 | 11/2010 |
| JP | 2011-159388 | 8/2011 |
| JP | 2011-192445 | 9/2011 |
| JP | 2014-7117 | 1/2014 |
| JP | 2014-527267 | 10/2014 |

OTHER PUBLICATIONS

Office Action dated Oct. 11, 2016 in Japanese Application No. 2016-510882.

* cited by examiner

NONAQUEOUS ELECTROLYTE BATTERY, BATTERY PACK, AND VEHICLE

CROSS-REFERENCE TO RELATED APPLICATION

This application is a Continuation Application of PCT Application No. PCT/JP2015/076071, filed Sep. 14, 2015; the entire contents of which are incorporated herein by reference.

FIELD

Embodiments described herein relate generally to a nonaqueous electrolyte battery, a battery pack, and a vehicle.

BACKGROUND

Extensive studies have been made for a nonaqueous electrolyte battery which performs charge and discharge by moving lithium ions between a negative electrode and a positive electrode as a high-energy density battery.

This nonaqueous electrolyte battery is expected to be used as a medium/large power supply in addition to the use as a compact electronic device power supply. The life performance and high safety are required in the application field of the medium/large power supply.

A lithium transition metal composite oxide is used as a positive electrode active material of the nonaqueous electrolyte battery. Examples of the transition metal are Co, Mn, and Ni. In recent years, extensive studies have been made for spinel type lithium manganate and an olivine type compound such as olivine type lithium iron phosphate and olivine type lithium manganese phosphate as an inexpensive and highly safe positive electrode material.

Since the olivine type compound has a low electron conductivity, it is difficult to obtain excellent charge-and-discharge performance. The lithium manganese phosphate is preferable among the olivine type compounds in consideration of the energy density and the oxidation potential of an electrolytic solution. However, since the lithium manganese phosphate has low electron and ion conductivities, it is difficult to obtain excellent charge-and-discharge performance. In particular, the lithium manganese phosphate has low charge-and-discharge performance and accordingly poor rapid charge performance.

DETAILED DESCRIPTION

According to one embodiment, a nonaqueous electrolyte battery including a negative electrode, a positive electrode, and a nonaqueous electrolyte is provided. The negative electrode contains a negative electrode active material. The positive electrode contains a positive electrode active material. The negative electrode active material contains a titanium-containing composite oxide. The positive electrode active material contains secondary particles of a first composite oxide and primary particles of a second composite oxide. The first composite oxide is represented by a general formula $LiMn_{1-x-y}Mg_xFe_yPO_4$ ($0<x\leq0.1$, $0<y\leq0.3$). The second composite oxide is represented by a general formula $LiCo_{1-a-b}Ni_aMn_bO_2$ ($0\leq a$, $b\leq0.5$).

According to another embodiment, a battery pack is provided. The battery pack includes a nonaqueous electrolyte battery according to the embodiment.

According to further another embodiment, a vehicle is provided. The vehicle includes a battery pack according to the embodiment.

A nonaqueous electrolyte battery according to an embodiment comprises a negative electrode containing a negative electrode active material containing a titanium-containing composite oxide, a positive electrode containing a positive electrode active material containing a first composite oxide and a second composite oxide, and a nonaqueous electrolyte. The first composite oxide is a secondary particulate composite oxide having a composition represented by the general formula $LiMn_{1-x-y}Mg_xFe_yPO_4$ ($0<x\leq0.1$, $0<y\leq0.3$). The second composite oxide is a primary particulate composite oxide having a composition represented by the general formula $LiCo_{1-a-b}Ni_aMn_bO_2$ ($0\leq a$, $b\leq0.5$).

Since the redox reaction of $Mn^{2+/3+}$ of lithium manganese phosphate is slow, the charge-and-discharge reaction tends not to progress. For this reason, when the lithium manganese phosphate is used as an active material in the positive electrode of the nonaqueous electrolyte battery, the charge speed must be increased. As a result of extensive studies, it was found that both of $LiCo_{1-a-b}Ni_aMn_bO_2$ ($0\leq a$, $b\leq0.5$) and the manganese lithium phosphate are used as the positive electrode active material, the charge performance of the positive electrode containing the positive electrode active material was improved. In particular, when the positive electrode active material containing secondary particles of $LiMn_{1-x-y}Mg_xFe_yPO_4$ ($0<x\leq0.1$, $0\leq y\leq0.3$) that has a crystal structure of the lithium manganese phosphate containing Mg and primary particles of $LiCo_{1-a-b}Ni_aMn_bO_2$ ($0\leq a$, $b\leq0.5$) is used, the charge performance was greatly improved. Thus, it was found that both high charge performance and excellent life performance were achieved.

Embodiments will be described below with reference to the accompanying drawings.

(First Embodiment)

Figure 1:
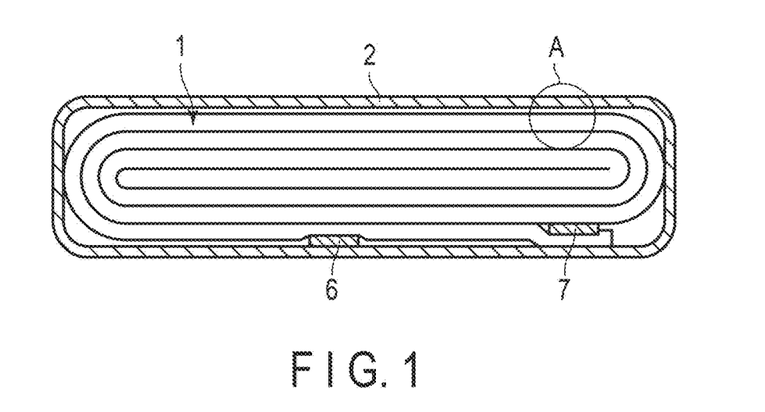
FIG. 1 is a cross-sectional view of an example of a flat type nonaqueous electrolyte battery according to an embodiment.

A nonaqueous electrolyte secondary battery according to the first embodiment will be described more concretely, with reference to FIGS. 1 and 2. FIG. 1 shows a cross-sectional view of a flat nonaqueous electrolyte secondary battery according to the first embodiment, and FIG. 2 shows an enlarged cross-sectional view of part A in FIG. 1.

A flat wound electrode group 1 is housed in a bag-like container member 2 made of a laminate film in which a metallic layer is interposed between two resin films. The flat wound electrode group 1 is formed by spirally winding and pressing a laminate, in which a negative electrode 3, a separator 4, a positive electrode 5, and another separator 4 are laminated in this order from the outer side. The outermost negative electrode 3 has a configuration, in which, as shown in FIG. 1, a negative electrode mixed-material layer 3b including a negative electrode active material is formed on one inner side of a negative electrode current collector 3a. The other negative electrodes 3 are configured with the negative electrode mixed-material layer 3b formed on both of reverse sides of the negative electrode current collector 3a. The positive electrode 5 is configured with a positive electrode mixed-material layer 5b formed on both of reverse sides of a positive electrode current collector 5a.

Near an outer circumference of the wound electrode group 1, a negative electrode terminal 6 is connected to the negative electrode current collector 3a of the negative electrode 3 at the outermost. Also, near the outer circumference of the wound electrode group 1, a positive electrode terminal 7 is connected to the positive electrode current collector 5a of the positive electrode 5 on the inner side. The negative electrode terminal 6 and the positive electrode terminal 7 project out from an opening of the bag-like container member 2. For example, a liquid nonaqueous electrolyte is put in through the opening of the bag-like container member 2. The wound electrode group 1 and the liquid nonaqueous electrolyte are completely sealed by heat-sealing the opening in the bag-like container member 2. When heat-sealing, the negative electrode terminal 6 and the positive electrode terminal 7 are sandwiched by the bag-like container 2 at the opening.

Figure 2:
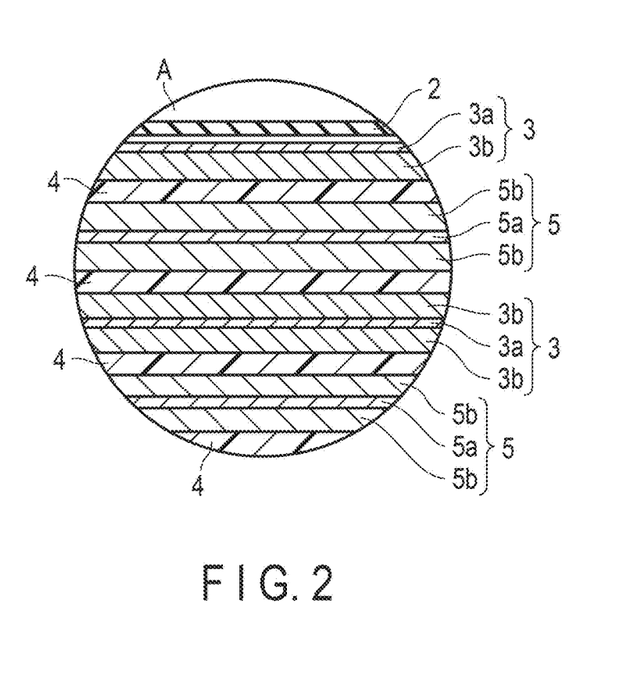
FIG. 2 is an enlarged cross-sectional view of part A of FIG. 1.
Figure 3:
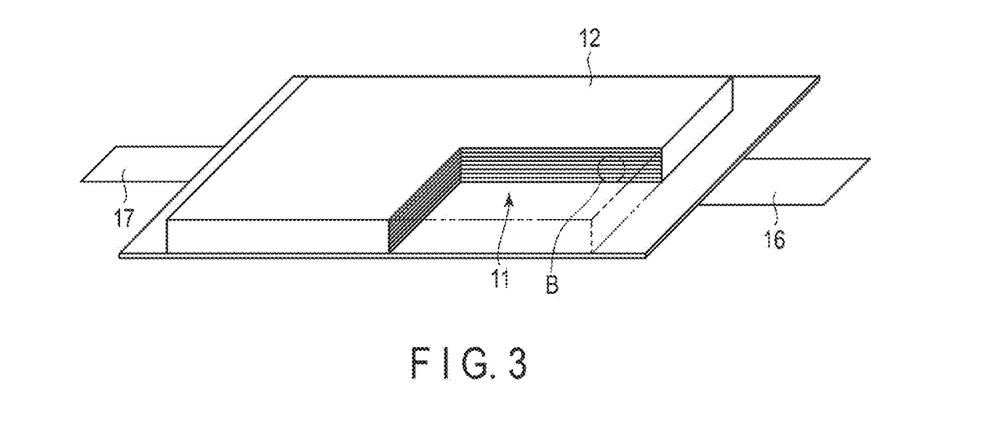
FIG. 3 is a schematic diagram showing another example of the flat type nonaqueous electrolyte battery according to the embodiment.
Figure 4:
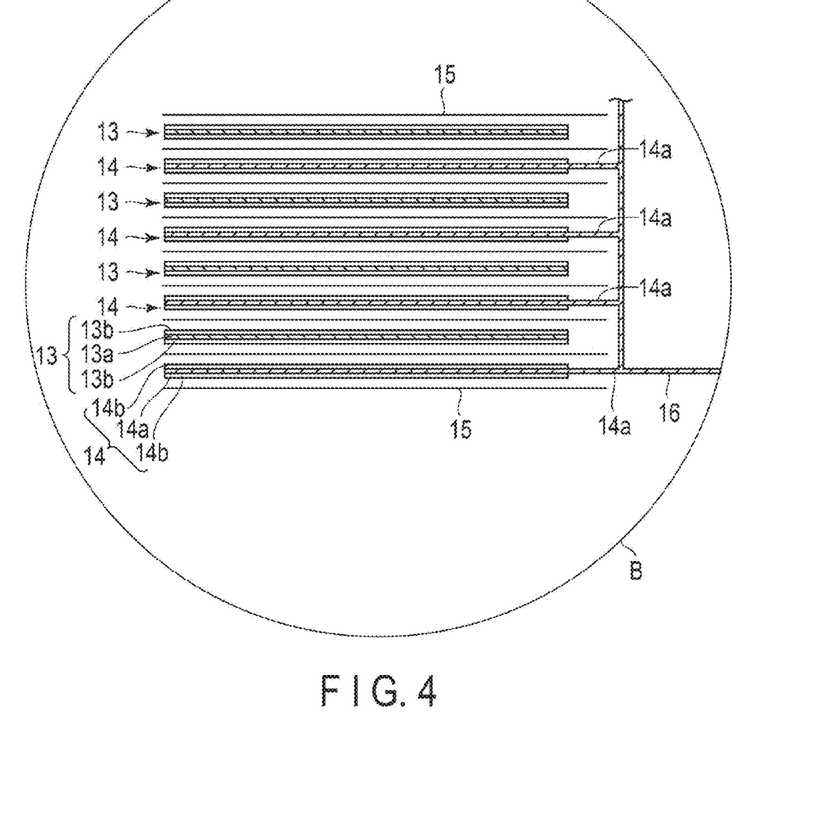
FIG. 4 is an enlarged cross-sectional view of part B of FIG. 3.

The nonaqueous electrolyte secondary battery according to the first embodiment is not limited to the configuration shown in FIGS. 1 and 2 and may be configured, for example, as shown in FIGS. 3 and 4. FIG. 3 is a partial cutout perspective view schematically showing another flat nonaqueous electrolyte secondary battery according to the first embodiment, and FIG. 4 is an enlarged sectional view of part B in FIG. 3.

A stacked electrode group 11 is housed in a container member 12 made of a laminate film, in which a metallic layer is interposed between two resin films. The stacked electrode group 11 has, as shown in FIG. 4, a structure in which a positive electrode 13 and a negative electrode 14 are alternately stacked with separator(s) 15 interposed therebetween. Plural positive electrodes 13 are present, and each of the plural positive electrodes includes a positive electrode current collector 13a and a positive electrode mixed-material layer 13b supported on both of reverse surfaces of the positive electrode current collector 13a. Plural negative electrodes 14 are present, and each of the plural negative electrodes includes a negative electrode current collector 14a and a negative electrode mixed-material layer 14b supported on both of reverse surfaces of the negative electrode current collector 14a. One end of the negative electrode current collector 14a of each of the negative electrodes 14 protrudes from the positive electrodes 13. The protruding ends of the negative electrode current collector 14a are electrically connected to a strip-shaped negative electrode terminal 16. One end of the strip-shaped negative electrode terminal 16 is drawn out of the container member 12. Though not illustrated, one end of the positive electrode current collector 13a protrudes from the negative electrodes 14. The end of the positive electrode current collector 13a protruding from the negative electrodes 14 is positioned on the side opposite to the protruding ends of negative electrode current collector 14a. The protruding ends of positive electrode current collector 13a are electrically connected to a strip-shaped positive electrode terminal 17. One end of the strip-shaped positive electrode terminal 17 is positioned opposite to the negative terminal 16 and is drawn out of the container member 12.

Hereinafter, the negative electrode, the positive electrode, the nonaqueous electrolyte, the separator, the container member, the positive electrode terminal, and the negative electrode terminal used in the nonaqueous electrolyte secondary battery according to the embodiment will be described in detail.

(Negative Electrode)

The negative electrode may include a negative electrode current collector and a negative electrode active material layer. The negative electrode active material layer may include a negative electrode active material, an electroconductive agent, and a binder. The negative electrode active material layer may be formed on one surface or both of reverse surfaces of the negative electrode current collector.

A negative electrode active material includes a titanium composite oxide. Examples of the titanium composite oxide which can be used as the negative electrode active material include lithium titanate having spinel structure, a monoclinic titanium composite oxide, an anatase type titanium composite oxide, a ramsdellite type lithium titanate, a niobium-titanium composite oxide represented by the general formula $Ti_{1-x}M_{x+y}Nb_{2-y}O_{7-\delta}$ ($0 \leq x < 1$, $0 \leq y < 1$, M includes at least one element selected from the group consisting of Mg, Fe, Ni, Co, W, Ta, and Mo), and an orthorhombic Na-containing niobium-titanium composite oxide represented by the general formula $Li_{2+v}Na_{2-w}M1_xTi_{6-y-2}Nb_yM2_zO_{14+\delta}$ ($0 \leq v \leq 4$, $0 < w < 2$, $0 \leq x < 2$, $0 < y \leq 6$, $0 \leq z < 3$, $-0.5 \leq \delta \leq 0.5$, M1 includes at least one element selected from the group consisting of Cs, K, Sr, Ba, and Ca, and M2 includes at least one element selected from the group consisting of Zr, Sn, V, Ta, Mo, W, Fe, Co, Mn, and Al). Among them all, the spinel type lithium titanate is preferable because it is excellent in life performance and rapid charge performance, that is cycle performance and rate performance. In addition, a niobium composite oxide may also be contained. Examples are $Nb_2O_5$ and $Nb_{12}O_{29}$. The negative electrode active material can exist in the form of particles in a negative electrode active material layer.

The composition of the negative electrode active material can be obtained by, for example, powder X-ray diffractometry. More specifically, first of all, a battery is set in a discharge state, and a negative electrode is extracted from the battery. An operation of extracting the negative electrode is preferably performed in an inert atmosphere such as an argon atmosphere. Subsequently, the extracted negative electrode is adhered to a glass sample plate. At this time, an operation of using double-sided tape or the like is performed so as to prevent the negative electrode from peeling off or floating from the glass sample plate. If necessary, the negative electrode may be cut into an appropriate size to be adhered to the glass sample plate. In addition, to correct a peak position, an Si reference sample may be added onto the negative electrode. Moreover, to set the negative electrode in the inert atmosphere while performing X-ray diffraction measurement, the negative electrode is preferably sealed so as to prevent it from contacting air. For example, the negative electrode is covered with a polyethylene film to prevent the negative electrode from being exposed to air. Subsequently, the glass sample plate adhered with the negative electrode is set in a powder X-ray diffraction apparatus, and a diffraction pattern is obtained using a Cu-Kα ray. The composition of the negative electrode active material contained in the negative electrode can be identified from the acquired diffraction pattern.

Here, the discharge state of the battery is a state in which the battery is discharged up to 1.5 V at a constant current of 0.2 C in an environment of 25° C. When the discharge state is set in a state in which plural batteries are connected in series with each other, a discharge end voltage is set as the (number of series-connected batteries)×1.5 V. For example, when five batteries are connected in series with each other, the discharge end voltage is given as 5×1.5 V, that is, 7.5 V.

A mixing ratio of a negative electrode active material, an electro-conductive agent, and a binder is preferably given such that the negative electrode active material falls within the range from 70 mass % to 96 mass %, the negative electrode electro-conductive agent falls within the range from 2 mass % to 28 mass %, and the binder falls within the range from 2 mass % to 28 mass %. If the electro-conductive agent is less than 2 mass %, the current collection performance of the negative electrode active material layer is degraded, and the large current performance of the nonaqueous electrolyte battery may be degraded. If the binder is less than 2 mass %, the adhesion between the negative electrode active material layer and the negative electrode current collector is degraded, and the cycle performance may be degraded. On the other hand, from the viewpoint of a high capacity, each of the electro-conductive agent and the binder is preferably 28 mass % or less.

The negative electrode current collector is preferably made of an aluminum foil electrochemically stable in the range of a potential nobler than 1.0 V or an aluminum alloy foil containing an element such as Mg, Ti, Zn, Mn, Fe, Cu, and Si.

A negative electrode can be formed by, for example, the following method. First of all, a negative electrode active material, an electro-conductive agent, and a binder are suspended in a solvent to prepare a slurry. This slurry is applied to one or both of the surfaces of a negative electrode current collector. The applied slurry is dried to form a negative electrode active material layer. After that, the current collector and the negative electrode active material layer are pressed. Alternatively, the negative electrode active material, the electro-conductive agent, and the binder are formed into pellets, and the pellets is used as the negative electrode active material layer. These pellets is formed on the negative electrode current collector to prepare a negative electrode.

In addition, the negative electrode can include a boron-containing film. This boron-containing film can exists on the surface of the negative electrode active material particle in the negative electrode active material layer. When the negative electrode comprises the boron-containing film, both the excellent charge performance and excellent life performance are achieved. In addition, the boron-containing film can also contain Mg and Co.

The boron contained in the negative electrode can be measured by ICP-AES (Inductively Coupled Plasma Atomic Emission Spectroscopy). More specifically, after the battery is set in the discharge state, the negative electrode is extracted from the battery. An operation of extracting the negative electrode is preferably performed in an argon atmosphere. Subsequently, the negative electrode active material is scraped off the current collector to obtain a sample. The sample is thermally decomposed using sulfuric acid, nitric acid, perchloric acid or the like. The resultant product is dissolved in dilute nitric acid, and the volume of the solution is fixed to regular volume. A boron content can be quantified by ICP-AES using this solution. A preferable boron content is 0.05 wt % to 0.8 wt % with respect to the total weight of the negative electrode.

(Positive Electrode)

The positive electrode may include a positive electrode current collector and a positive electrode active material layer (positive electrode mixed-material layer). The positive electrode active material layer may include a positive electrode active material, an electro-conductive agent, and a binder. The positive electrode active material layer may be formed on one surface or both of reverse surfaces of the positive electrode current collector.

The positive electrode active material contains $LiMn_{1-x-y}Mg_xFe_yPO_4$ ($0<x\leq0.1$, $0\leq y\leq0.3$) as the first composite oxide and $LiCo_{1-a-b}Ni_aMn_bO_2$ ($0\leq a$, $b\leq0.5$) as the second composite oxide.

When both of $LiCo_{1-a-b}Ni_aMn_bO_2$ ($0\leq a$, $b\leq0.5$) and lithium manganese phosphate serving as the positive electrode active material, the charge performance of the positive electrode containing the positive electrode active material is improved. In particular, when the positive electrode active material containing secondary particles of $LiMn_{1-x-y}Mg_xFe_yPO_4$ ($0<x\leq0.1$, $0\leq y\leq0.3$) that has a crystal structure of the lithium manganese phosphate containing Mg and primary particles of $LiCo_{1-a-b}Ni_aMn_bO_2$ ($0\leq a$, $b\leq0.5$) are used, the charge performance is greatly improved, and both high charge performance and excellent life performance are achieved. The secondary particle as used herein refers to, a particle obtained by bringing primary particles into contact and coagulating the primary particles. Therefore, the secondary particle of the first composite oxide is obtained by coagulating primary particles represented by the general formula $LiMn_{1-x-y}Mg_xFe_yPO_4$ ($0<x\leq0.1$, $0<y\leq0.3$).

The average particle size of the secondary particles of the first composite oxide is preferably 5 μm to 25 μm. If the secondary particle size exceeds 25 μm, the charge performance of the positive electrode can be degraded. If the secondary particle size is smaller than 5 μm, the size is small as the secondary particle. In this case, an amount of binder must be large, and the energy density of the positive electrode is lowered. If the amount of binder is large, the viscosity of a slurry for forming the positive electrode active material layer increases. This makes it difficult to form a positive electrode.

The average particle size of primary particles of the first composite oxide is preferably 50 nm to 300 nm. If the primary particle size exceeds 300 nm, the charge performance of the positive electrode tends to be lowered. If the primary particle size is smaller than 50 nm, the reaction area between the first composite oxide and the nonaqueous electrolytic solution increases. As a result, the amount of side reactions increases, thus the resistance tends to increase.

The average particle size of primary particles of the second composite oxide is preferably 3 μm to 15 μm. If the primary particle size exceeds 15 μm, an effect of improving the charge performance of the positive electrode is decreased. If the primary particle size is smaller than 3 μm, the particle size becomes small as $LiCo_{1-a-b}Ni_aMn_bO_2$ ($0\leq a$, $b\leq0.5$), the specific surface area increases, and an resistance due to the side reactions between the second composite oxide and the nonaqueous electrolytic solution is likely to increase.

The particle size of the secondary particles of the first composite oxide is preferably almost equal to that of the primary particles of the second composite oxide. More specifically, letting $R_1$ be the secondary particle size of the first composite oxide and $R_2$ be the primary particle size of the second composite oxide, $1.0<R_1/R_2\leq10$ is preferably satisfied. If $R_1/R_2$ is 1.0 or less, an effect of improving the charge performance is decreased. If $R_1/R_2$ exceeds 10, it indicates that the size of the secondary particles of the first composite oxide is excessively large or the size of the primary particles of the second composite oxide is excessively small. In this case, it is difficult to achieve the charge performance improving effect and the suppression of the side reaction with the nonaqueous electrolytic solution.

The secondary particles of the first composite oxide and the primary particles of the second composite oxide in the positive electrode active material can be confirmed using a SEM (Scanning Electron Microscope). In particular, the average particle size of the secondary particles of the composite oxide in the active material can be obtained as follows.

First of all, a positive electrode active material is set as a sample for SEM measurement. More specifically, after a battery is set in a discharge state, a positive electrode is extracted from a battery. An operation of extracting the positive electrode is preferably performed in an inert atmosphere such as an argon atmosphere. Subsequently, the extracted positive electrode is adhered onto an SEM sample table. At this time, an electro-conductive tape or the like is used to prevent the positive electrode from peeling off or floating from the sample table. The positive electrode may be cut into an appropriate size so as to adhere the cut electrode on the glass sample plate, as needed. The positive electrode is introduced into a sample room in a state in which the positive electrode is maintained in an inert atmosphere while performing SEM measurement.

The discharge state of the battery is a state in which the battery is discharged up to 1.5 V at a constant current of 0.2 C in an environment of 25° C. When a discharge state is set in a state in which plural batteries are connected in series with each other, a discharge end voltage is set as the (number of series-connected batteries)×1.5 V. For example, when five batteries are connected in series with each other, the discharge end voltage is given as 5×1.5 V, that is, 7.5 V.

The cross-section of the positive electrode active material layer of the positive electrode thus prepared is measured at a magnification of ×2000 by SEM. As used herein, a secondary particle refers to a particle group by which primary particles contacting each other can be confirmed. If the primary particles are small, and particularly 300 nm or less, the contact portion of the primary particles is not clearly observed, and the primary particles may be seen as one large particle at the magnification of ×2000. At this time, this large particle can be observed at a magnification of ×10000 to ×100000, thus confirming that one large particle is formed from fine primary particles.

The diameter of a minimum circumscribed circle corresponding to this secondary particle is obtained. 10 secondary particles are observed from SEM measurement of the cross-section of the active material layer. The maximum and minimum values of the minimum circumscribed circles thus obtained are removed. The arithmetic mean of the eight values except the largest and smallest values out of 10 diameters of the minimum circumscribed circles thus obtained is obtained. The arithmetic mean of the diameters of the obtained minimum circumscribed circles is defined as the average particle size of the secondary particles.

The content of the second composite oxide, that is, $LiCo_{1-a-b}Ni_aMn_bO_2$ (0≤a, b≤0.5) in the positive electrode according to this embodiment is preferably 5 wt % to 30 wt % of the entire positive electrode active material contained in the positive electrode. If the content of the second composite oxide is smaller than 5 wt %, an effect of improving the rapid charge performance is decreased. If the content of the second composite oxide exceeds 30 wt %, excellent life performance may not be obtained. If the content of the second composite oxide is 5 wt % to 30 wt %, both the improved rapid charge performance and excellent life performance can be reliably achieved.

The intensity ratio of a specific peak obtained by powder X-ray diffractometry using the Cu-Kα ray can be estimated as an index of the weight ratio between the first composite oxide and the second composite oxide in the positive electrode.

An X-ray diffraction spectrum obtained by measuring the positive electrode active material containing the first composite oxide and the second composite oxide using powder X-ray diffractometry using the Cu-Kα ray has a peak appearing in the range of 19° to 21° and a peak appearing in the range of 43° to 46°. The spectrum preferably satisfies the following formula (I):

$$0.6 \leq I_1/I_2 \leq 7 \qquad (I)$$

Here, $I_1$ is the peak intensity of a peak having the highest peak intensity in the range of 19° to 21° on the spectrum. And, $I_2$ is the peak intensity of a peak having the highest peak intensity in the range of 43° to 46° on the above spectrum.

If $I_1/I_2$ is smaller than 0.6, the life performance may be degraded. If $I_1/I_2$ exceeds 7, an effect of improving the rapid charge performance is decreased. When the above formula (I) is satisfied, both excellent life performance and excellent rapid charge performance can be reliably achieved. Although the reason why such effect is obtained is not clear, the reason can be estimated based on the following reason.

The peak having the highest peak intensity out of the peaks appearing in the range of 19° to 21° is regarded as a peak derived from the first composite oxide according to the following confirmation method. The peak having the highest peak intensity out of the peaks appearing in the range of 43° to 46° is regarded as a peak derived from the second composite oxide according to the following confirmation method.

The fact that the peaks on the X-ray diffraction spectrum are derived from the first composite oxide and the second composite oxide can be confirmed as follows. First of all, existence of the peak assigned to a space group Pnma and the peak assigned to a space group R-3m are confirmed from the X-ray diffraction pattern. The space group of the first composite oxide is Pnma, and the space group of the second composite oxide is R-3m. Since no peaks derived from the second composite oxide are found in the range of 19° to 21°, the strongest peak appearing in the range of 19° to 21° is derived from the first composite oxide. In addition, if peaks derived from the first composite oxide exist in the range of 43° to 46°, the peak intensity is very week. Therefore, the peak derived from the second composite oxide becomes the strongest peak when the first and second composite oxides are mixed.

A measurement method by the above X-ray diffractometry will be described below. More specifically, after the battery is set in the discharge state, the positive electrode is extracted from the battery. An operation of extracting the positive electrode is preferably performed in an inert atmosphere such as an argon atmosphere. The extracted positive electrode is adhered to the glass sample plate. At this time, an operation is performed using a double-sided tape or the like so as to prevent the positive electrode from peeling off or floating from the glass sample plate. If necessary, the positive electrode may be cut into an appropriate size so as to adhere the positive electrode to the glass sample plate. In addition, to correct a peak position, an Si reference sample may be added onto the positive electrode. To maintain the positive electrode in the inert atmosphere while performing X-ray diffraction measurement, the positive electrode is preferably sealed so as to prevent it from contacting air. For example, the positive electrode is covered with a polyethylene film to prevent the positive electrode from being exposed to air. Subsequently, the glass sample plate adhered with the negative electrode is set in a powder X-ray diffraction apparatus, and a diffraction pattern (X-ray diffraction spectrum) is obtained using a Cu-Kα ray.

The discharge state of the battery is a state in which the battery is discharged up to 1.5 V at a constant current of 0.2 C in an environment of 25° C. When the discharge state is set in a state in which plural batteries are connected in series with each other, a discharge end voltage is set as the (number of series-connected batteries)×1.5 V. For example, when five batteries are connected in series with each other, the discharge end voltage is given as 5×1.5 V, that is, 7.5 V.

In addition to the powder X-ray diffractometry, an SEM (Scanning Electron Microscope) and EDX (Energy Dispersive X-ray spectroscopy) can be used to obtain the composition of the composite oxide contained in the positive electrode active material in the positive electrode. More specifically, the composition of the composite oxide contained in the positive electrode active material can be identified from the diffraction pattern obtained as described above in the XRD measurement.

If some of the particles observed in the SEM-EDX observation contain Mn, Fe, Mg, P, or O, the X-ray diffraction pattern is combined with the SEM-EDX observation result to determine whether the particles containing such an element is the first composite oxide. If some of the particles observed the SEM-EDX observation contain Ni, Co, Mn, or O, the X-ray diffraction pattern and the SEM-EDX observation result are combined to determine whether the particles containing such an element is the second composite oxide.

A method of manufacturing a positive electrode active material containing $LiMn_{1-x-y}Mg_xFe_yPO_4$ ($0<x\leq0.1$, $0\leq y\leq0.3$) as the first composite oxide and $LiCo_{1-a-b}Ni_aMn_bO_2$ ($0\leq a$, $b\leq0.5$) as the second composite oxide according to this embodiment will now be described below.

A hydrothermal method is preferable as a method of manufacturing $LiMn_{1-x-y}Mg_xFe_yPO_4$ ($0<x\leq0.1$, $0\leq y\leq0.3$). In a solid phase method such as a general ceramic synthesis method, the particle size of $LiMn_{1-x-y}Mg_xFe_yPO_4$ ($0<x\leq0.1$, $0\leq y\leq0.3$) may be increased, and an impurity may be produced. It is easy to dope Mg in the hydrothermal method. In addition, it is easy to obtain fine primary particles of $LiMn_{1-x-y}Mg_xFe_yPO_4$ ($0<x\leq0.1$, $0\leq y\leq0.3$) having high crystallinity in the hydrothermal method.

The secondary particles of the first composite oxide can be manufactured by various methods such as wet-process granulation and dry-process granulation.

In wet-process granulation, using a binder for forming secondary particles, secondary particles are formed by spray drying using a solution containing primary particles or rolling of the solution. For example, in a method such as spray drying, primary particles synthesized by the above hydrothermal method can be spray-dried to prepare the secondary particles of the first composite oxide. At this time, an organic material may be added to the solution, and the resultant solution may be thermally dried in an inert atmosphere. Accordingly, carbon can be attached to the surface of the particle. This makes it possible to obtain the first composite oxide excellent in electron conductivity.

In the dry-process granulation, the secondary particles are formed by compression of primary particles or physical shock of primary particles.

A method of manufacturing the secondary particles is not limited to a specific one. In a wet-process, spray drying is preferable. In addition, in a dry-process, secondary particle formation by compression is preferable.

To control the size of primary particles contained in the secondary particle of the first composite oxide, for example, the conditions of the hydrothermal method are adjusted. Hydrothermal synthesis temperature and time, the concentration of a starting material in a solution in hydrothermal synthesis, and the like can be adjusted. Reducing the hydrothermal synthesis temperature, shortening the hydrothermal synthesis time, increasing the starting material concentration, and the like can reduce the size of primary particles.

When a first composite oxide is synthesized by a solid phase method, the particle size can be controlled by reducing the particle size of the starting material or grinding the particles after solid phase synthesis.

To control the secondary particle size, in spray drying, for example, an amount of binder for binding primary particles each other or the concentration of a precursor solution containing primary particles and the binder is controlled. By reducing the amount of binder or reducing the precursor concentration, the secondary particle size can be reduced.

A solid phase method is preferable as a method of manufacturing $LiCo_{1-a-b}Ni_aMn_bO_2$ ($0\leq a$, $b\leq0.5$). Since the solid phase method is inexpensive and simple process, the solid phase method is suitable as the method of manufacturing $LiCo_{1-a-b}Ni_aMn_bO_2$ ($0\leq a$, $b\leq0.5$). In the manufacture of $LiCo_{1-a-b}Ni_aMn_bO_2$ ($0\leq a$, $b\leq0.5$) by the solid phase method, powder particles of the starting material are mixed, and the mixture is heat-treated in air, thereby obtaining a target composite oxide. The particle size of the starting material is preferably 5 μm or less, and more preferably 2 μm or less. A material having a small particle size is used to reduce the particle size of the target composite oxide, thereby obtaining excellent charge performance.

Examples of the electro-conductive agent include carbonaceous materials such as acetylene black, carbon black, graphite, carbon nanofiber, and carbon nanotube. These carbonaceous materials may be used alone, or plural carbonaceous materials may be used.

A binder binds an active material, an electro-conductive agent, and a current collector. Examples of the binder are polytetrafluoroethylene (PTFE), polyvinylidene fluoride (PVdF), fluorine-based rubber, acrylic resin, and a cellulose such as carboxymethyl cellulose.

The contents of the positive electrode active material, the electro-conductive agent, and the binder in the positive electrode layer are preferably 80 mass % to 95 mass %, 3 mass % to 18 mass %, and 2 mass % to 17 mass %, respectively. If the content of the electro-conductive agent is 3 mass % or more, the above effect can be obtained. If the content of the electro-conductive agent is 18 mass % or less, the decomposition of a nonaqueous electrolyte on the surface of the electro-conductive agent under high-temperature storage can be decreased. If the content of the binder is 2 mass % or more, a sufficient electrode strength can be obtained. If the content of the binder is 17 mass % or less, the content of the binder as an insulating material in the positive electrode can be reduced. As a result, an internal resistance can be decreased. The current collector is preferably made of an aluminum foil or an aluminum alloy foil containing at least one element selected from the group consisting of Mg, Ti, Zn, Mn, Fe, Cu, and Si.

A positive electrode can be manufactured by, for example, the following method. First of all, the secondary particles of the first composite oxide and the primary particles of the second composite oxide which are obtained as described above, an electro-conductive agent, and a binder are suspended in a solvent to prepare a slurry. This slurry is applied to one or both of the surfaces of the current collector. The applied slurry is then dried to form a positive electrode active material layer. After that, the current collector and the positive electrode active material layer are pressed.

Although various methods are available as the slurry preparation method and the press method, any method can be used as far as the secondary particles of the first composite oxide are not crushed.

The slurry preparation method is exemplified by dispersion using, for example, a planetary mixer or a bead mill apparatus. The method using the planetary mixer is more preferable. This is because in the method of dispersing the slurry by applying a physical shock, for example, by the bead mill, the secondary particles may be crushed.

The press method is exemplified by pressing using, for example, a roll press apparatus. The electrode density after the formation of the positive electrode is preferably 1.7 to 2.0 g/cc. If the electrode density exceeds 2.0 g/cc, the secondary particles tend to be crushed. If the electrode density is lower than 1.7 g/cc, the contact between the active material and the electro-conductive agent is degraded, and the charge-and-discharge performance of the battery may not be improved.

The positive electrode can further include a boron-containing film. This boron-containing film can exist on the surfaces of the primary particles of the first and second composite oxides. If the positive electrode includes the boron-containing film, both the excellent charge performance and excellent life performance can be achieved.

The boron contained in the positive electrode can be measured by ICP-AES. More specifically, after a battery is set in a discharge state, a positive electrode is extracted from a battery. An operation of extracting the positive electrode is preferably performed in an argon atmosphere. Subsequently, the positive electrode active material is scraped off the current collector to obtain a sample. The sample is thermally decomposed using sulfuric acid, nitric acid, perchloric acid or the like. The resultant product is dissolved in dilute nitric acid, and the volume of the solution is fixed to regular volume. A boron content can be quantified by ICP-AES using this solution. A preferable boron content is 0.05 wt % to 0.8 wt % with respect to the total weight of the positive electrode.

(Nonaqueous Electrolyte)

A liquid nonaqueous electrolyte or a gel-like nonaqueous electrolyte can be used as the nonaqueous electrolyte. The liquid nonaqueous electrolyte can be prepared by dissolving an electrolyte in an organic solvent. The concentration of the electrolyte preferably is 0.5 to 2.5 mol/L. The gel-like nonaqueous electrolyte can be prepared by obtaining a composite of a liquid electrolyte and a polymer material. Note that the liquid nonaqueous electrolyte is also called nonaqueous electrolyte solution.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroasenide ($LiAsF_6$), lithium trifluoromethanesulfonate ($LiCF_3SO_3$), and lithium bistrifluoromethylsulfonylimide ($LiN(CF_3SO_2)_2$). These electrolytes can be used singly or in a combination of two or more electrolytes. The electrolyte preferably contains $LiPF_6$.

Examples of the organic solvent include a cyclic carbonate such as propylene carbonate (PC), ethylene carbonate (EC), and vinylene carbonate (VC), a chain carbonate such as diethyl carbonate (DEC), dimethyl carbonate (DMC), and methyl ethyl carbonate (MEC), a cyclic ether such as tetrahydrofuran (THF), 2-methyltetrahydrofuran (2-MeTHF), and dioxolane (DOX), a chain ether such as dimethoxyethane (DME) and diethoxyethane (DEE), gamma-butyrolactone (GBL), alpha-methyl gamma-butyrolactone (MBL), acetonitrile (AN), and sulfolane (SL). These organic solvents can be used singly or in a combination of two or more solvents.

More preferable examples of the organic solvent include a solvent mixture obtained by mixing two or more materials selected from the group consisting of propylene carbonate (PC), ethylene carbonate (EC), diethyl carbonate (DEC), dimethyl carbonate (DMC), and methyl ethyl carbonate (MEC), and a solvent mixture containing alpha-butyrolactone (GBL). By using these solvent mixtures, a nonaqueous electrolyte battery excellent in low-temperature performance can be obtained.

Various types of electrolytic solution additives may be added to a nonaqueous electrolytic solution. To form boron-containing films on the positive and negative electrodes, for example, a boron-containing additive is preferably contained in a nonaqueous electrolytic solution in the range from 1 wt % to 3 wt %.

Examples of the boron-containing additive include lithium bisoxalate borate (LiBOB), lithium oxalate difluoroborate (LiODFB), lithium tetrafluoroborate ($LiBF_4$), tris(trimethylsilyl)borate (TMSB), and tris(pentafluorophenyl)borane (TPFPB).

When a nonaqueous electrolyte battery containing a nonaqueous electrolytic solution added with the above additive is charged up to a battery voltage of 2.6 V or more during initial charging, boron-containing films can be formed on the negative and positive electrodes. More specifically, when the negative electrode potential reaches 1.5 V vs. $Li/Li^+$ or less, the boron-containing additive is decomposed near the negative electrode. When the positive electrode potential reaches 4.1 V vs. $Li/Li^+$ or more, the boron-containing additive is decomposed near the positive electrode. In this manner, the boron-containing additive reacts, and this makes it possible to form the boron-containing films on the positive and negative electrodes.

Examples of the polymeric material include polyvinylidene difluoride (PVdF), polyacrylonitrile (PAN), and polyethylene oxide (PEO).

(Separator)

A porous film, a synthetic resin unwoven fabric, or the like formed from, for example, polyethylene (PE), polypropylene (PP), cellulose, or polyvinylidene fluoride (PVdF) can be used as a separator. Among them all, a porous film made of polyethylene or polypropylene can be melted at a predetermined temperature and cut off a current. This porous film is preferable from the viewpoint of safety improvement.

(Container Member)

As the container member, a bag-like container made of a laminate film or a metal case may be used.

Examples of the shape of the container member include flat form, square form, cylindrical form, coin-shaped, button-shaped, sheet form, stack form. Certainly, the container member may be that for a compact battery installed on mobile electronic devices, or a large battery installed on vehicles such as two-wheeled to four-wheeled automobiles.

As the laminate film, used is a multilayer film having a metal layer sandwiched between resin films. The metal layer is preferably an aluminum foil or an aluminum alloy foil, so as to reduce weight. The resin film may be, for example, a polymeric material such as polypropylene (PP), polyethylene (PE), nylon, or polyethylene terephthalate (PET). The laminate film may be heat-sealed to be formed into the shape of a container member. The film thickness of the laminate film is preferably 0.2 mm or less.

The metal case may be formed of aluminum or an aluminum alloy. The aluminum alloy preferably includes an element such as magnesium, zinc, and silicon. On the other hand, an amount of a transition metal such as iron, copper, nickel, or chromium included in the alloy is preferably 100 ppm, or less. Thereby, long-term reliability and heat radiating abilities under high temperature environments can be increased greatly. The wall thickness of the metal case is more preferably 0.5 mm or less, and still more preferably 0.2 mm or less.

(Negative Electrode Terminal)

The negative electrode terminal may be made of, for example, a material that is electrically stable within the potential range of 1.0 V to 3.0 V (vs. Li/Li$^+$) relative to lithium ion metal, and has electrical conductivity. The negative electrode terminal is preferably made of aluminum or an aluminum alloy including an element such as Mg, Ti, Zn, Mn, Fe, Cu, and Si. The negative electrode terminal is preferably made of the same material as the negative electrode current collector in order to reduce contact resistance with the negative electrode current collector.

(Positive Electrode Terminal)

The positive electrode terminal may be made of, for example, a material that is electrically stable within the potential range of 3.0 V to 4.5 V (vs. Li/Li$^+$) relative to lithium ion metal, and has electrical conductivity. The positive electrode terminal is preferably made of aluminum or an aluminum alloy including an element such as Mg, Ti, Zn, Mn, Fe, Cu, and Si. The positive electrode terminal is preferably made of the same material as the positive electrode current collector in order to reduce contact resistance with the positive electrode current collector.

According to the above embodiment, there is provided a nonaqueous electrolyte battery comprising a negative electrode containing a negative electrode active material containing a titanium-containing composite oxide, a positive electrode containing a positive electrode active material containing secondary particles of the first composite oxide and primary particles of the second composite oxide, and a nonaqueous electrolyte. In this case, the first composite oxide is represented by the general formula $LiMn_{1-x-y}Mg_xFe_yPO_4$ (0<x≤0.1, 0<y≤0.3), and the second composite oxide is represented by the general formula $LiCo_{1-a-b}Ni_aMn_bO_2$ (0≤a, b ≤0.5). This nonaqueous electrolyte battery is excellent in both rapid charge performance and life performance.

(Second Embodiment)

A battery pack according to the second embodiment includes one or plural nonaqueous electrolyte batteries (single batteries) of the first embodiment. If the battery pack includes plural single batteries, the single batteries are connected in series or parallel.

Such a battery pack will be described in detail with reference to FIGS. 5 and 6. A flat battery shown in FIG. 1 can be used as the single battery.

Plural single-batteries 21 are stacked such that the externally projected negative electrode terminals 6 and positive electrode terminals 7 are aligned in the same direction and fastened by an adhesive tape 22 to constitute a battery module 23. As shown in FIG. 6, these single-batteries 21 are electrically connected in series to each other.

A printed wiring board 24 is disposed to face toward a side surface, among the side surfaces of the single-batteries 21, from which the negative electrode terminals 6 and the positive electrode terminals 7 project. As shown in FIG. 6, a thermistor 25, a protective circuit 26, and an external power distribution terminal 27 are mounted on the printed wiring board 24. Additionally, an electric insulating plate (not shown) is mounted on the surface of the printed wiring board 24 facing toward the battery module 23 to avoid unnecessary contact with wiring of the battery module 23.

A positive electrode-side lead 28 is connected to the positive electrode terminal 7 positioned lowermost in the battery module 23. One end of the positive electrode-side lead 28 is inserted into a positive electrode connector 29 of the printed wiring board 24, and thereby electrically connecting the positive electrode-side lead 28 to the printed wiring board 24. A negative electrode-side lead 30 is connected to the negative electrode terminal 6 positioned uppermost layer in the battery module 23. One end of the negative electrode-side lead 30 is inserted into a negative electrode connector 31 of the printed wiring board 24, thereby electrically connecting the negative electrode-side lead 30 to the printed wiring board 24. The connectors 29 and 31 are connected to the protective circuit 26 via wirings 32 and 33 formed on the printed wiring board 24.

The thermistor 25 detects the temperature of the single-batteries 21. The pertaining detection signal is sent to the protective circuit 26. The protective circuit 26 can cut-off a positive-side wiring 34a and a negative-side wiring 34b between the protective circuit 26 and the external power distribution terminal 27 under a predetermined condition. The predetermined condition is, for example, when the temperature detected by the thermistor 25 rises to a predetermined temperature or higher. Also, the predetermined condition is when an over-charge, an over-discharge, or an over-current of the single-batteries 21 is detected. An over-charge or the like is detected for an individual single-battery 21 or all of the single-batteries 21 as a whole. When an individual single-battery 21 is detected, the battery voltage may be detected, or the positive electrode potential or negative electrode potential may be detected. In the latter case, a lithium electrode used as a reference electrode is inserted into each of the single-batteries 21. In the case of FIGS. 5 and 6, a wire 35 for voltage detection is connected to each of the single-batteries 21. A detection signal is sent to the protective circuit 26 through these wires 35.

Protective sheets 36 made of rubber or resin is arranged on each of three side surfaces of the battery module 23. More specifically, the protective sheets 36 are arranged on the three sides surfaces excluding the side surface from which the positive electrode terminals 7 and the negative electrode terminals 6 project.

The battery module 23 is housed in a housing container 37 together with each of the protective sheets 36 and the printed wiring board 24. That is, the protective sheets 36 are arranged on each of both inner side surfaces along a long-side direction and on one of the inner side surfaces along a short-side direction of the housing container 37. The printed wiring board 24 is arranged on an inner side surface opposite to the protective sheet 36 that is arranged along the short-side direction. The battery module 23 is positioned in a space surrounded by the protective sheets 36 and the printed wiring board 24. A cover 38 is mounted on top of the housing container 37.

Instead of the adhesive tape 22, a heat-shrinkage tape may be used to fix the battery module 23. In this case, protective sheets are arranged on both side surfaces of the battery module, and after the heat-shrinkage tape is wound around the battery module and protective sheets, the heat-shrinkage tape is allowed to heat-shrink to bind the battery module together.

Figure 5:
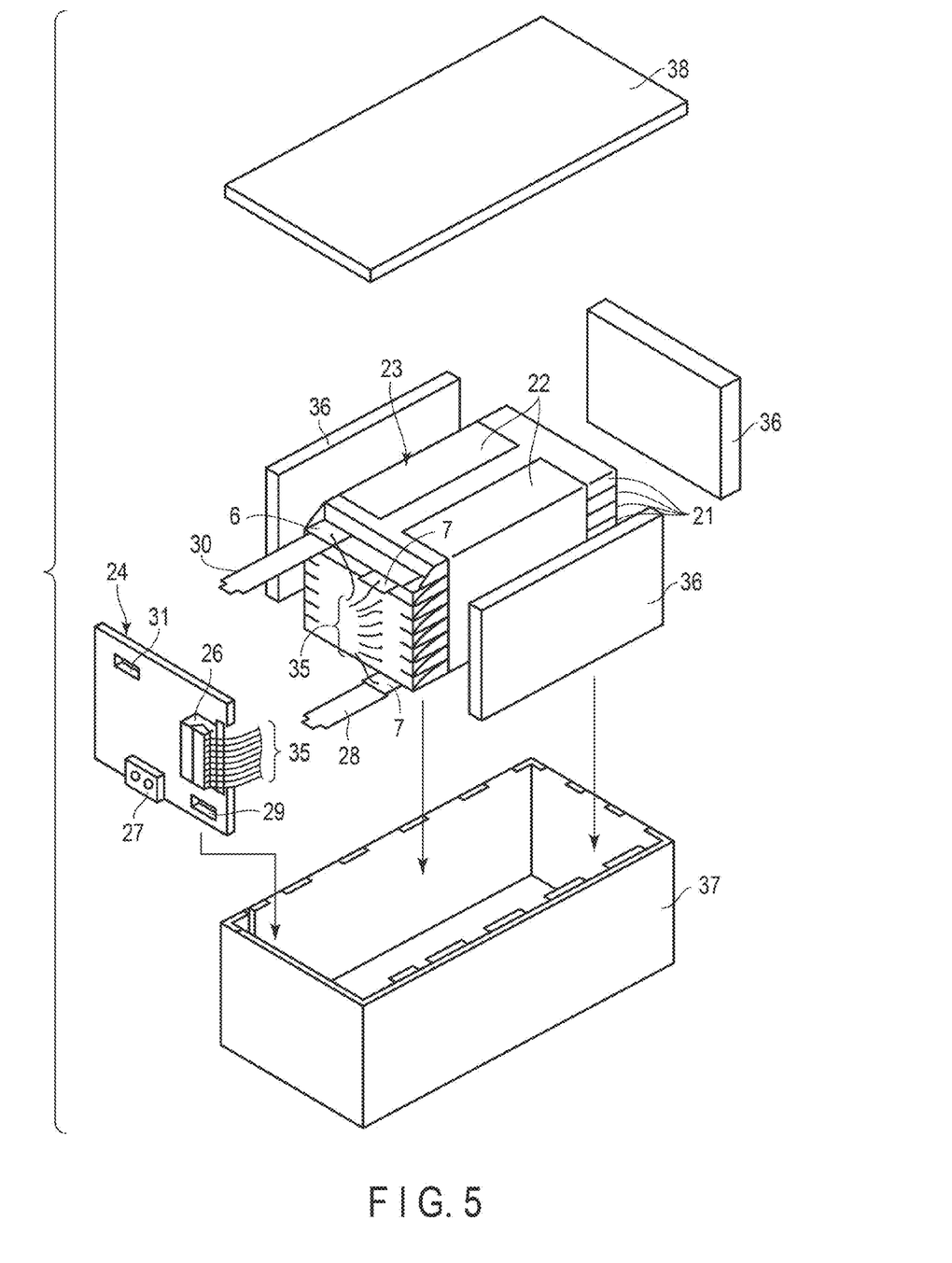
FIG. 5 is an exploded perspective view of an example of a battery pack according to the embodiment.
Figure 6:
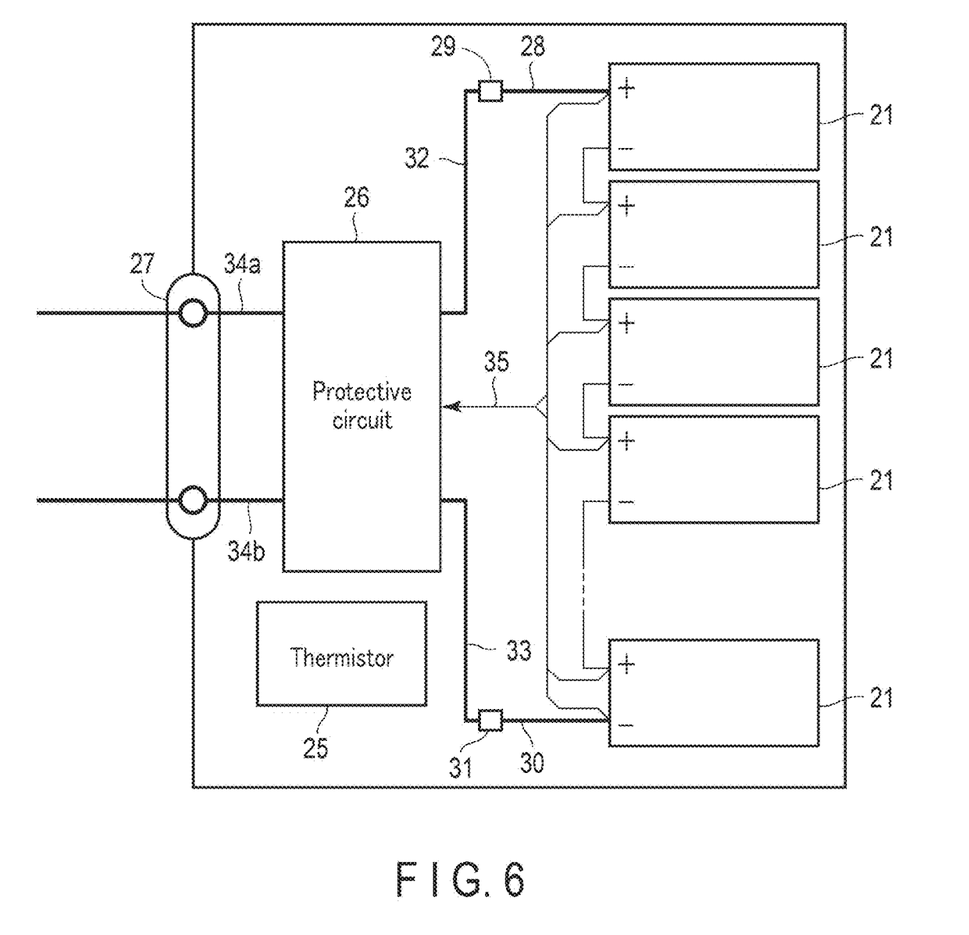
FIG. 6 is a block diagram showing an electric circuit of the battery pack in FIG. 5.

While FIGS. 5 and 6 show an embodiment in which the single-batteries 21 are connected in series, the single-batteries may be connected in parallel to increase the battery capacity. In addition, assembled battery packs may further be connected in series or in parallel.

The embodiments of the battery pack can be changed, as needed, depending on an application. As an application of the battery pack, it is preferable that both large current discharge performance and good life performance are desired. Examples of the practical application include a battery for the power supply of a digital camera, and a vehicle-installed battery for a two- or four-wheel hybrid electric vehicle, a two- or four-wheel electric vehicle, and an electric assist bicycle. In particular, the battery pack can be suitably used for the vehicle-installed battery.

According to the embodiment described above, there is provided a battery pack including at least one nonaqueous electrolyte battery. The nonaqueous electrolyte battery of the battery pack is the nonaqueous electrolyte battery according to the first embodiment. Since the battery pack includes the nonaqueous electrolyte battery according to the first embodiment, the battery pack is excellent in both rapid charge performance and life performance.

EXAMPLES

Examples will be described below. The present invention is not limited to the Examples to be described below without departing from the scope of the present invention.

Example 1

<Production of First Composite Oxide>

A first composite oxide was produced as follows.

First of all, primary particles of the first composite oxide were synthesized by a hydrothermal synthesis method. More specifically, lithium sulfide ($Li_2SO_4$), manganese sulfate pentahydrate ($MgSO_4 \cdot 5H_2O$), magnesium sulfate heptahydrate ($MgSO_4 \cdot 7H_2O$), iron sulfate heptahydrate ($FeSO_4 \cdot 7H_2O$), diammonium hydrogen phosphate (($NH_4)_2HPO_4$), and sodium carboxymethyl cellulose were dissolved in pure water in a nitrogen atmosphere. The contents of the starting materials were adjusted such that the molar ratio Li:Mn:Mg:Fe of the dissolved metal elements was set to 3:0.85:0.05:0.1.

A solution containing the above starting materials was poured into an autoclave and was sealed. A heat treatment was performed at 200° C. for 3 hours while stirring. After the heat treatment, sample particles produced in the solution were removed and the particles cleared with pure water. The resultant sample particles were primary particles having an average particle size of 100 nm.

The prepared primary particles were mixed in an aqueous solution, and the resultant mixture was spray-dried to obtain secondary particles. A secondary particle sample was heat-treated at 700° C. for 1 hour in an argon atmosphere. The first composite oxide thus obtained included secondary particles of $LiMn_{0.85}Mg_{0.05}Fe_{0.1}PO_4$ having an average particle size (secondary particle size) of 20 µm.

<Production of Second Composite Oxide>

A second composite oxide was produced as follows.

Lithium carbonate ($Li_2CO_3$), cobalt oxide ($Co_3O_4$), and nickel oxide (NiO) were mixed to obtain a powder mixture. At this time, they were mixed such that a molar ratio Li:Co:Ni of the elements was set to 1:0.8:0.2. This powder mixture was heat-treated at 850° C. for 10 hours in air. As a result, the primary particles of $LiCo_{0.8}Ni_{0.2}O_2$ having the average particle size of 8 µm as the second composite oxide were obtained.

<Production of Positive Electrode>

The first composite oxide and the second composite oxide thus obtained were mixed to obtain an active material powder mixture. The second composite oxide was mixed such that its content was 10% of the total positive electrode active material weight.

90 wt % of the resultant active material powder mixture, 5 wt % of acetylene black as an electro-conductive agent, and 5 wt % of polyvinylidene fluoride (PVdF) were mixed in N-methylpyrrolidone (NMP) to prepare a slurry. This slurry was applied onto both surfaces of a current collector made of a 15-µm thick aluminum foil and was dried. The current collector and the dried slurry were pressed to form a positive electrode having an electrode density of 2.0 $g/cm^3$.

Figure 7:
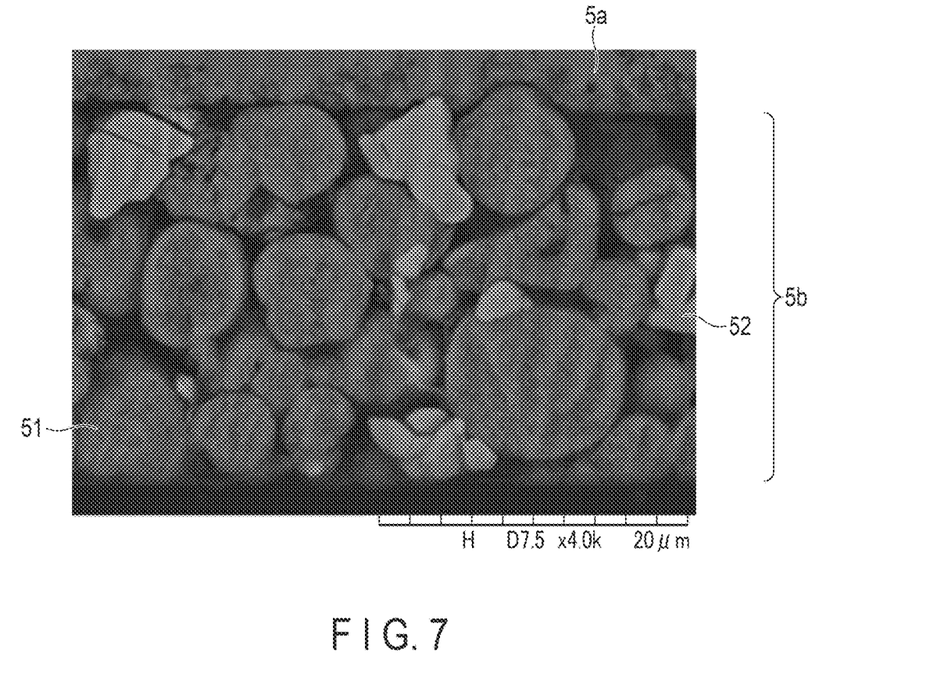
FIG. 7 is an SEM photograph showing a cross-section of a positive electrode active material layer of an example.

FIG. 7 is an SEM photograph showing the cross-section of the produced positive electrode. In the SEM photograph in FIG. 7, the first composite oxide particle 51 as the secondary particle consisting of primary particles of $LiMn_{0.85}Mg_{0.05}Fe_{0.1}PO_4$ and the second composite oxide particle 52 as the primary particle of $LiCo_{0.8}Ni_{0.2}O_2$ can be confirmed. As described above, the first composite oxide particle 51 can be seen as if the particle were one large particle at the magnification shown in FIG. 7.

<Production of Negative Electrode>

90 wt % of a $Li_4Ti_5O_{12}$ powder, 5 wt % of acetylene black, and 5 wt % of polyvinylidene fluoride (PVdF) were mixed in N-methylpyrrolidone (NMP) to prepare a slurry. This slurry was applied onto both surfaces of a current collector made of a 15-µm thick aluminum foil and was dried. The current collector and the dried slurry were pressed to form a negative electrode having an electrode density of 2.0 $g/cm^3$.

<Production of Electrode Group>

A positive electrode, a separator made of a 25-µm thick polyethylene porous film, a negative electrode, and a separator were stacked in the order named, and the resultant stacked pair was wound in a spiral shape. The resultant structure was heat-pressed at 90° C., thereby obtaining a flat electrode group having a width of 30 mm and a thickness of 3.0 mm. The resultant electrode group was stored in a laminate film pack. The resultant structure was vacuum-dried at 80° C. for 24 hours. The laminate film is formed by forming polypropylene layers on both surfaces of a 40-µm thick aluminum foil, and the total thickness is 0.1 mm.

<Preparation of Liquid Nonaqueous Electrolyte>

Propylene carbonate (PC) and diethyl carbonate (DEC) were mixed at a volume ratio of 1:2 to obtain a solvent mixture. $LiPF_6$ as an electrolyte was dissolved by 1M in the solvent mixture. In addition, 1.0 wt % of LiBOB was added with respect to the nonaqueous electrolyte weight to prepare a liquid nonaqueous electrolyte.

<Manufacture of Nonaqueous Electrolyte Secondary Battery>

The liquid nonaqueous electrolyte was poured into a laminate film pack in which the electrode group was stored. After that, the pack was perfectly sealed by a heat seal. A nonaqueous electrolyte secondary battery having a width of 35 mm, a thickness of 3.2 mm, and a height of 65 mm and having the structure shown in FIG. 1 described above was manufactured. This nonaqueous electrolyte secondary battery was given as a battery cell of Example 1.

Example 2

A battery cell of Example 2 was manufactured following the same procedure as in Example 1 except that the secondary particle size of the first composite oxide contained in a positive electrode active material was set to 25 μm.

Example 3

A battery cell of Example 3 was manufactured following the same procedure as in Example 1 except that the secondary particle size of the first composite oxide contained in a positive electrode active material was set to 10 μm.

Example 4

A battery cell of Example 4 was manufactured following the same procedure as in Example 1 except that the secondary particle size of the first composite oxide contained in a positive electrode active material was set to 5 μm.

Example 5

A battery cell of Example 5 was manufactured following the same procedure as in Example 1 except that the secondary particle size of the first composite oxide contained in a positive electrode active material was set to 30 μm.

Example 6

A battery cell of Example 6 was manufactured following the same procedure as in Example 1 except that the secondary particle size of the first composite oxide contained in a positive electrode active material was set to 4 μm.

Example 7

A battery cell of Example 7 was manufactured following the same procedure as in Example 1 except that the primary particle size of the first composite oxide contained in a positive electrode active material was set to 50 nm.

Example 8

A battery cell of Example 8 was manufactured following the same procedure as in Example 1 except that the primary particle size of the first composite oxide contained in a positive electrode active material was set to 200 nm.

Example 9

A battery cell of Example 9 was manufactured following the same procedure as in Example 1 except that the primary particle size of the first composite oxide contained in a positive electrode active material was set to 300 nm.

Example 10

A battery cell of Example 10 was manufactured following the same procedure as in Example 1 except that the primary particle size of the first composite oxide contained in a positive electrode active material was set to 30 nm.

Example 11

A battery cell of Example 11 was manufactured following the same procedure as in Example 1 except that the primary particle size of the first composite oxide contained in a positive electrode active material was set to 500 nm.

Example 12

A battery cell of Example 12 was manufactured following the same procedure as in Example 1 except that the content of the second composite oxide contained in a positive electrode active material was set to 5% of the total positive electrode material weight.

Example 13

A battery cell of Example 13 was manufactured following the same procedure as in Example 1 except that the content of the second composite oxide contained in a positive electrode active material was set to 20% of the total positive electrode material weight.

Example 14

A battery cell of Example 14 was manufactured following the same procedure as in Example 1 except that the content of the second composite oxide contained in a positive electrode active material was set to 30% of the total positive electrode material weight.

Example 15

A battery cell of Example 15 was manufactured following the same procedure as in Example 1 except that the composition of the second composite oxide contained in a positive electrode active material was set to $LiCo_{0.5}Ni_{0.25}Mn_{0.25}O_2$.

Example 16

A battery cell of Example 16 was manufactured following the same procedure as in Example 1 except that the composition of the second composite oxide contained in a positive electrode active material was set to $LiCo_{0.3}Ni_{0.4}Mn_{0.3}O_2$.

Example 17

A battery cell of Example 17 was manufactured following the same procedure as in Example 1 except that the composition of the second composite oxide contained in a positive electrode active material was set to $LiCo_{0.2}Ni_{0.5}Mn_{0.3}O_2$.

Example 18

A battery cell of Example 18 was manufactured following the same procedure as in Example 1 except that the composition of the second composite oxide contained in a positive electrode active material was set to $LiCoO_2$.

Example 19

A battery cell of Example 19 was manufactured following the same procedure as in Example 1 except that monoclinic $TiO_2$ was used as a negative electrode active material.

Example 20

A battery cell of Example 20 was manufactured following the same procedure as in Example 1 except that monoclinic $TiNb_2O_7$ was used as a negative electrode active material.

Example 21

A battery cell of Example 21 was manufactured following the same procedure as in Example 1 except that monoclinic $Li_2Na_{1.8}Ti_{5.8}Nb_{0.2}O_{14}$ was used as a negative electrode active material.

Comparative Example 1

A battery cell of Comparative Example 1 was manufactured following the same procedure as in Example 1 except that primary particles having the same composition and an average particle size of 100 nm were used as the first composite oxide contained in the positive electrode active material in place of the secondary particles of $LiMn_{0.85}Mg_{0.05}Fe_{0.1}PO_4$.

Comparative Example 2

A battery cell of Comparative Example 2 was manufactured following the same procedure as in Comparative Example 1 except that secondary particles having a secondary particle size of 20 μm and made of primary particles having the same composition and an average particle size of 3 μm were used as the second composite oxide contained in the positive electrode active material in place of the primary particles of $LiCo_{0.8}Ni_{0.2}O_2$.

Comparative Example 3

A battery cell of Comparative Example 3 was manufactured following the same procedure as in Example 1 except that secondary particles having a secondary particle size of 20 μm and made of primary particles having the same composition and an average particle size of 3 μm were used as the second composite oxide contained in the positive electrode active material in place of the primary particles of $LiCo_{0.8}Ni_{0.2}O_2$.

Comparative Example 4

Primary particles of $LiMn_{0.85}Mg_{0.05}Fe_{0.1}PO_4$ having an average particle size of 100 nm were used as the first composite oxide, and primary particles of $LiCo_{0.0}Ni_{0.2}O_2$ having an average particle size of 5 μm were used as the second composite oxide. The first composite oxide and the second composite oxide were poured into water such that the content of the second composite oxide was set to 10% of the total positive electrode active material weight to prepare a solution mixture. Using this solution mixture, the primary particles were formed into secondary particles by spray drying to obtain secondary particles having a secondary particle size of 30 μm. A battery cell of Comparative Example 4 was manufactured following the same procedure as in Example 1 except that the resultant secondary particles were used as the positive electrode active material.

Comparative Example 5

A battery cell of Comparative Example 5 was manufactured following the same procedure as in Example 1 except that the composition of the first composite oxide contained in a positive electrode active material was set to $LiMn_{0.8}Fe_{0.2}PO$.

Comparative Example 6

A battery cell of Comparative Example 6 was manufactured following the same procedure as in Comparative Example 1 except that the composition of the first composite oxide contained in a positive electrode active material was set to $LiMn_{0.8}Fe_{0.2}PO_4$.

The compositions of the first composite oxides and the second composite oxides used for the positive electrode active materials, their primary particle sizes and secondary particle sizes, the contents of the second composite oxides with respect to the total weights of the positive electrode active materials, and the compositions of the negative electrode active materials in the manufacture of the battery cells in Examples 1 to 21 are summarized in Table 1. The corresponding conditions in the manufacture of the battery cells in Comparative Examples 1 to 6 are summarized in Table 2.

TABLE 1

|  | First Composite Oxide (Positive Electrode Active Material) | Primary Particle Size/Secondary Particle Size | Second Composite Oxide (Positive Electrode Active Material) | Primary Particle Size/Secondary Particle Size | Content of Second Composite Oxide (wt %) | Negative Electrode Active Material |
|---|---|---|---|---|---|---|
| Example 1 | $LiMn_{0.85}Mg_{0.05}Fe_{0.1}PO_4$ | 100 nm/20 μm | $LiCo_{0.8}Ni_{0.2}O_2$ | 8 μm/— | 10 | $Li_4Ti_5O_{12}$ |
| Example 2 | $LiMn_{0.85}Mg_{0.05}Fe_{0.1}PO_4$ | 100 nm/25 μm | $LiCo_{0.8}Ni_{0.2}O_2$ | 8 μm/— | 10 | $Li_4Ti_5O_{12}$ |
| Example 3 | $LiMn_{0.85}Mg_{0.05}Fe_{0.1}PO_4$ | 100 nm/10 μm | $LiCo_{0.8}Ni_{0.2}O_2$ | 8 μm/— | 10 | $Li_4Ti_5O_{12}$ |
| Example 4 | $LiMn_{0.85}Mg_{0.05}Fe_{0.1}PO_4$ | 100 nm/5 μm | $LiCo_{0.8}Ni_{0.2}O_2$ | 8 μm/— | 10 | $Li_4Ti_5O_{12}$ |
| Example 5 | $LiMn_{0.85}Mg_{0.05}Fe_{0.1}PO_4$ | 100 nm/30 μm | $LiCo_{0.8}Ni_{0.2}O_2$ | 8 μm/— | 10 | $Li_4Ti_5O_{12}$ |
| Example 6 | $LiMn_{0.85}Mg_{0.05}Fe_{0.1}PO_4$ | 100 nm/4 μm | $LiCo_{0.8}Ni_{0.2}O_2$ | 8 μm/— | 10 | $Li_4Ti_5O_{12}$ |
| Example 7 | $LiMn_{0.85}Mg_{0.05}Fe_{0.1}PO_4$ | 50 nm/20 μm | $LiCo_{0.8}Ni_{0.2}O_2$ | 8 μm/— | 10 | $Li_4Ti_5O_{12}$ |
| Example 8 | $LiMn_{0.85}Mg_{0.05}Fe_{0.1}PO_4$ | 200 nm/20 μm | $LiCo_{0.8}Ni_{0.2}O_2$ | 8 μm/— | 10 | $Li_4Ti_5O_{12}$ |
| Example 9 | $LiMn_{0.85}Mg_{0.05}Fe_{0.1}PO_4$ | 300 nm/20 μm | $LiCo_{0.8}Ni_{0.2}O_2$ | 8 μm/— | 10 | $Li_4Ti_5O_{12}$ |
| Example 10 | $LiMn_{0.85}Mg_{0.05}Fe_{0.1}PO_4$ | 30 nm/20 μm | $LiCo_{0.8}Ni_{0.2}O_2$ | 8 μm/— | 10 | $Li_4Ti_5O_{12}$ |
| Example 11 | $LiMn_{0.85}Mg_{0.05}Fe_{0.1}PO_4$ | 500 nm/20 μm | $LiCo_{0.8}Ni_{0.2}O_2$ | 8 μm/— | 10 | $Li_4Ti_5O_{12}$ |
| Example 12 | $LiMn_{0.85}Mg_{0.05}Fe_{0.1}PO_4$ | 100 nm/20 μm | $LiCo_{0.8}Ni_{0.2}O_2$ | 8 μm/— | 5 | $Li_4Ti_5O_{12}$ |
| Example 13 | $LiMn_{0.85}Mg_{0.05}Fe_{0.1}PO_4$ | 100 nm/20 μm | $LiCo_{0.8}Ni_{0.2}O_2$ | 8 μm/— | 20 | $Li_4Ti_5O_{12}$ |
| Example 14 | $LiMn_{0.85}Mg_{0.05}Fe_{0.1}PO_4$ | 100 nm/20 μm | $LiCo_{0.8}Ni_{0.2}O_2$ | 8 μm/— | 30 | $Li_4Ti_5O_{12}$ |
| Example 15 | $LiMn_{0.85}Mg_{0.05}Fe_{0.1}PO_4$ | 100 nm/20 μm | $LiCo_{0.5}Ni_{0.25}Mn_{0.25}O_2$ | 8 μm/— | 10 | $Li_4Ti_5O_{12}$ |
| Example 16 | $LiMn_{0.85}Mg_{0.05}Fe_{0.1}PO_4$ | 100 nm/20 μm | $LiCo_{0.3}Ni_{0.4}Mn_{0.3}O_2$ | 8 μm/— | 10 | $Li_4Ti_5O_{12}$ |
| Example 17 | $LiMn_{0.85}Mg_{0.05}Fe_{0.1}PO_4$ | 100 nm/20 μm | $LiCo_{0.2}Ni_{0.5}Mn_{0.3}O_2$ | 8 μm/— | 10 | $Li_4Ti_5O_{12}$ |
| Example 18 | $LiMn_{0.85}Mg_{0.05}Fe_{0.1}PO_4$ | 100 nm/20 μm | $LiCoO_2$ | 8 μm/— | 10 | $Li_4Ti_5O_{12}$ |
| Example 19 | $LiMn_{0.85}Mg_{0.05}Fe_{0.1}PO_4$ | 100 nm/20 μm | $LiCo_{0.8}Ni_{0.2}O_2$ | 8 μm/— | 10 | $TiO_2$ |
| Example 20 | $LiMn_{0.85}Mg_{0.05}Fe_{0.1}PO_4$ | 100 nm/20 μm | $LiCo_{0.8}Ni_{0.2}O_2$ | 8 μm/— | 10 | $TiNb_2O_7$ |

TABLE 1-continued

|  | First Composite Oxide (Positive Electrode Active Material) | Primary Particle Size/Secondary Particle Size | Second Composite Oxide (Positive Electrode Active Material) | Primary Particle Size/Secondary Particle Size | Content of Second Composite Oxide (wt %) | Negative Electrode Active Material |
|---|---|---|---|---|---|---|
| Example 21 | $LiMn_{0.85}Mg_{0.05}Fe_{0.1}PO_4$ | 100 nm/20 μm | $LiCo_{0.8}Ni_{0.2}O_2$ | 8 μm/— | 10 | $Li_2Na_{1.8}Ti_{5.8}Nb_{0.2}O_{14}$ |

TABLE 2

|  | First Composite Oxide (Positive Electrode Active Material) | Primary Particle Size/Secondary Particle Size | Second Composite Oxide (Positive Electrode Active Material) | Primary Particle Size/Secondary Particle Size | Content of Second Composite Oxide (wt %) | Negative Electrode Active Material |
|---|---|---|---|---|---|---|
| Comparative Example 1 | $LiMn_{0.85}Mg_{0.05}Fe_{0.1}PO_4$ | 100 nm/— | $LiCo_{0.8}Ni_{0.2}O_2$ | 8 μm/— | 10 | $Li_4Ti_5O_{12}$ |
| Comparative Example 2 | $LiMn_{0.85}Mg_{0.05}Fe_{0.1}PO_4$ | 100 nm/— | $LiCo_{0.8}Ni_{0.2}O_2$ | 3 μm/20 μm | 10 | $Li_4Ti_5O_{12}$ |
| Comparative Example 3 | $LiMn_{0.85}Mg_{0.05}Fe_{0.1}PO_4$ | 100 nm/20 μm | $LiCo_{0.8}Ni_{0.2}O_2$ | 3 μm/20 μm | 10 | $Li_4Ti_5O_{12}$ |
| Comparative Example 4 | $LiMn_{0.85}Mg_{0.05}Fe_{0.1}PO_4$ | 100 nm/— | $LiCo_{0.8}Ni_{0.2}O_2$ | 5 μm/— | 10 | $Li_4Ti_5O_{12}$ |
| Comparative Example 5 | $LiMn_{0.8}Fe_{0.2}PO_4$ | 100 nm/20 μm | $LiCo_{0.8}Ni_{0.2}O_2$ | 8 μm/— | 10 | $Li_4Ti_5O_{12}$ |
| Comparative Example 6 | $LiMn_{0.8}Fe_{0.2}PO_4$ | 100 nm/— | $LiCo_{0.8}Ni_{0.2}O_2$ | 8 μm/— | 10 | $Li_4Ti_5O_{12}$ |

<Charge Test>

The charge tests were conducted in a 25° C. environment using each of the battery cells manufactured in Examples 1 to 21 and Comparative Examples 1 to 6. Charging was performed at constant current charging from the SOC 0%. Charging was stopped when the battery voltage reached 2.7 V. First of all, a charge capacity was measured at the charge rate of 1C, thereby obtaining a 1C charge capacity. Subsequently, the SOC 0% was set again. A charge capacity was measured at the charge rate of 5C from the SOC 0%, thereby obtaining a 5C charge capacity. The resultant 5C charge capacity was divided by the 1C charge capacity to calculate a 5C/1C charge capacity ratio. The 5C/1C charge capacity ratio serves as the index of rapid charge performance of each battery cell.

<Charge-and-Discharge Cycle Test>

Charge-and-discharge cycle tests were conducted in a 60° C. environment using each of the battery cells manufactured in Examples 1 to 21 and Comparative Examples 1 to 6. Charging was performed in a constant-current constant-voltage mode. The charge conditions of each cycle were a charge rate of 1C and a charge voltage of 2.7 V. Charging was stopped when 3 hours had elapsed or a current value reached 0.05C current value. Discharging was performed in a constant current mode. The number of cycles performed in each charge-and-discharge cycle test of each battery cell was 500.

The 500-cycle charge-and-discharge cycle tests were conducted for the respective battery cells, and then the charge capacities were measured. The 500-cycle discharge capacity was divided by the discharge capacity before the charge-and-discharge cycle test, thereby obtaining the 500-cycle capacity retention ratio at 60° C. The 500-cycle capacity retention ratio at 60° C. serves as the index of the battery cell life performance.

<Powder X-Ray Diffraction>

The measurements for the positive electrodes included in Examples 1 to 21 and Comparative Examples 1 to 6 were performed by powder X-ray diffractometry as described above.

In Examples 1 to 11 each in which the content ratio of $LiMn_{0.85}Mg_{0.05}Fe_{0.1}PO_4$ as the first composite oxide and $LiCo_{0.8}Ni_{0.2}O_2$ as the second composite oxide was set to 90:10, the ratio $I_1/I_2$ exhibited an almost constant value of about 2.3. No influence of the primary and secondary particle sizes of the first composite oxide on the ratio $I_1/I_2$ was observed.

In Examples 12 to 14 each in which similarly $LiMn_{0.85}Mg_{0.05}Fe_{0.1}PO_4$ was used as the first composite oxide and $LiCo_{0.8}Ni_{0.2}O_2$ was used as the second composite oxide, the content ratio of the first composite oxide and the second composite oxide changed, and the ratio $I_1/I_2$ also changed. More specifically, in Example 12 in which content ratio of these composite oxides was set to 95:5, the ratio $I_1/I_2$ was 6.8. In Example 13 in which content ratio of these composite oxides was set to 80:20, the ratio $I_1/I_2$ was 1.0. In Example 14 in which content ratio of these composite oxides was set to 70:30, the ratio $I_1/I_2$ was 0.7. These results indicate that the content ratio of $LiMn_{0.85}Mg_{0.05}Fe_{0.1}PO_4$ and $LiCo_{0.8}Ni_{0.2}O_2$ can be estimated from the ratio $I_1/I_2$.

<ICP-AES Measurement>

ICP-AES measurements of the positive and negative electrodes in Examples 1 to 21 and Comparative Examples 1 to 6 were performed. It was confirmed that boron-containing films were formed on the positive and negative electrodes in all the battery cells in Examples 1 to 21 and Comparative Examples 1 to 6.

Table 3 shows the 5C/1C discharge capacity ratios, 500-cycle capacity retention ratios at 60° C., and ratios $I_1/I_2$ of the battery cells in Examples 1 to 21 and Comparative Examples 1 to 6.

TABLE 3

|  | 5C/1C Charge Capacity Ratio (%) | 60° C., 500-Cycle Capacity Retention Ratio (%) | $I_1/I_2$ |
|---|---|---|---|
| Example 1 | 84 | 88 | 2.3 |
| Example 2 | 83 | 90 | 2.3 |

TABLE 3-continued

|  | 5C/1C Charge Capacity Ratio (%) | 60° C., 500-Cycle Capacity Retention Ratio (%) | $I_1/I_2$ |
|---|---|---|---|
| Example 3 | 88 | 82 | 2.3 |
| Example 4 | 90 | 81 | 2.3 |
| Example 5 | 81 | 90 | 2.3 |
| Example 6 | 90 | 78 | 2.3 |
| Example 7 | 87 | 84 | 2.3 |
| Example 8 | 82 | 88 | 2.3 |
| Example 9 | 77 | 90 | 2.3 |
| Example 10 | 87 | 82 | 2.3 |
| Example 11 | 75 | 91 | 2.3 |
| Example 12 | 79 | 92 | 6.8 |
| Example 13 | 90 | 86 | 1.0 |
| Example 14 | 91 | 81 | 0.7 |
| Example 15 | 79 | 92 | 2.3 |
| Example 16 | 76 | 94 | 2.2 |
| Example 17 | 74 | 93 | 2.3 |
| Example 18 | 87 | 90 | 2.5 |
| Example 19 | 80 | 82 | 2.3 |
| Example 20 | 81 | 79 | 2.3 |
| Example 21 | 76 | 79 | 2.3 |
| Comparative Example 1 | 66 | 63 | 2.3 |
| Comparative Example 2 | 55 | 66 | 2.3 |
| Comparative Example 3 | 70 | 87 | 2.3 |
| Comparative Example 4 | 64 | 80 | 2.3 |
| Comparative Example 5 | 70 | 72 | 2.3 |
| Comparative Example 6 | 60 | 56 | 2.3 |

It can be seen that reducing the secondary particle size of $LiMn_{0.85}Mg_{0.05}Fe_{0.1}PO_4$ leads to an improvement of rapid charge performance from the results of Examples 1 to 6. On the other hand, the life performance is improved by increasing the secondary particle size. If the secondary particle size is less than 5 μm, the improvement effect of the life performance cannot be observed clearly. If the secondary particle size exceeds 25 μm, the improvement of rapid charge performance does not observed clearly. In accordance with the above description, it is obvious that the secondary particle size of $LiMn_{0.85}Mg_{0.05}Fe_{0.1}PO_4$ is preferably 5 μm to 25 μm.

It can be seen that reducing the primary particle size of $LiMn_{0.85}Mg_{0.05}Fe_{0.1}PO_4$ leads to an improvement of rapid charge performance from the results in Examples 1 and 7 to 11. Similar to the secondary particle size, it can be seen that increasing the primary particle size improves the life performance. From the viewpoint of achieving both rapid charge performance and excellent life performance, it is obvious that the primary particle size of $LiMn_{0.8}Mg_{0.05}Fe_{0.1}PO_4$ is preferably 50 nm to 300 nm.

From the results of Examples 12 to 14, it was found a trend where increasing the content of $LiCo_{0.8}Ni_{0.2}O_2$ improved rapid charge performance when the content ratio of $LiMn_{0.85}Mg_{0.05}Fe_{0.1}PO_4$ and $LiCo_{0.8}Ni_{0.2}O_2$ was changed. On the other hand, along with an increase in the content of $LiCo_{0.1}Ni_{0.2}O_2$, it was found that the life performance tended to degrade. From the viewpoint of achieving both rapid charge performance and excellent life performance, it is obvious that the ratio of $LiMn_{0.85}Mg_{0.05}Fe_{0.1}PO_4$ and $LiCo_{0.8}Ni_{0.2}O_2$ is preferably 70:30 to 95:5.

It is found from the results of Examples 15 to 18 that the improved rapid charge performance and life performance are achieved even if various active materials having composition represented by the general formula $LiCo_{1-a-b}Ni_aM_bO_2$ (0≤a, b ≤0.5) are used as the second composite oxide.

It is obvious from the results in Examples 19 to 21 that rapid charge performance and life performance are improved in the nonaqueous electrolyte batteries including the positive electrodes even if the negative electrode active materials each containing a titanium composite oxide except $Li_4Ti_5O_{12}$ are used.

It is found that rapid charge performance and life performance are degraded if both $LiMn_{0.85}Mg_{0.05}Fe_{0.1}PO_4$ and $LiCo_{0.8}Ni_{0.2}$ contained in the positive electrode are made of only primary particles, like the battery cell of Comparative Example 1, as compared with a case containing the secondary particles of $LiMn_{0.85}Mg_{0.05}Fe_{0.1}PO_4$ and the primary particles of $LiCo_{0.8}Ni_{0.2}O_2$. This is because the adhesion between $LiMn_{0.85}Mg_{0.05}Fe_{0.1}PO_4$ and the current collector is low since the fine primary particles of $LiMn_{0.85}Mg_{0.05}Fe_{0.1}PO_4$ are not formed into secondary particles. The rapid charge performance and life performance of the battery cell in Comparative Example 2 are degraded due to the lower adhesion between $LiMn_{0.85}Mg_{0.05}Fe_{0.1}PO_4$ and the current collector as in Comparative Example 1 even if only $LiCo_{0.8}Ni_{0.2}O_2$ is formed into secondary particles.

As in the battery cell of Comparative Example 3, when both $LiMn_{0.8}Mg_{0.05}Fe_{0.1}PO_4$ and $LiCo_{0.8}Ni_{0.2}O_2$ were formed into secondary particles, relatively good life performance was obtained. However, the improvement of rapid charge performance was not observed. This may be because the rapid charge performance is degraded by forming $LiCo_{0.8}Ni_{0.02}O_2$ into secondary particles. In the battery cell of Comparative Example 4, the primary particles of $LiMn_{0.85}Mg_{0.05}Fe_{0.1}PO_4$ and the primary particles of $LiCo_{0.8}Ni_{0.2}O_2$ are combined and formed into secondary particles, and rapid charge performance is not improved as in the battery cell of Comparative Example 3. In the battery cell of Comparative Example 4, the charge performance may be degraded because $LiCo_{0.8}Ni_{0.2}O_2$ is contained in the secondary particles.

In the battery cells of Comparative Examples 5 and 6, $LiMn_{0.8}Fe_{0.2}PO_4$ was used as the first composite oxide, and no improvement was found in rapid charge performance and life performance. This may be because an effect of improving rapid charge performance and life performance could not be sufficiently obtained because the first composite oxide was made of manganese lithium phosphate not containing Mg.

According to the above embodiments and examples, there is provided a nonaqueous electrolyte battery comprising a negative electrode containing a negative electrode active material containing a titanium-containing composite oxide, a positive electrode containing a positive electrode active material containing secondary particles of a first composite oxide represented by the general formula $LiMn_{1-x-y}Mg_xFe_yPO_4$ (0<x≤0.1, 0<y≤0.3) and primary particles of a second composite oxide represented by the general formula $LiCo_{1-a-b}Ni_aMn_bO_2$ (0≤a, b≤0.5), and a nonaqueous electrolyte. This nonaqueous electrolyte battery achieves both the improved rapid charge performance and the improved life performance.

While certain embodiments have been described, these embodiments are not intended to limit the scope of the inventions, and can be modified in various manners within the scope of subject matters of the inventions recited in the claims. In addition, the present invention can be modified in various manners in practice when implementing the invention without departing from the gist of the invention. By suitably combining the plurality of constituent features disclosed in the embodiments, various inventions may be formed.

What is claimed is:

1. A nonaqueous electrolyte battery comprising:
a negative electrode containing a negative electrode active material containing a titanium-containing composite oxide;
a positive electrode containing a positive electrode active material containing secondary particles of a first composite oxide represented by a general formula $LiMn_{1-x-y}Mg_xFe_yPO_4$ ($0<x\leq0.1$, $0<y\leq0.3$) and primary particles of a second composite oxide represented by a general formula $LiCo_{1-a-b}Ni_aMn_bO_2$ ($0\leq a$, $b\leq0.5$); and
a nonaqueous electrolyte.

2. The nonaqueous electrolyte battery according to claim 1, wherein the secondary particles of the first composite oxide comprise primary particles represented by the general formula $LiMn_{1-x-y}Mg_xFe_yPO_4$ ($0<x\leq0.1$, $0<y\leq0.3$), the secondary particles have an average particle size of 5 μm to 25 μm, and the primary particles have an average particle size of 50 nm to 300 nm.

3. The nonaqueous electrolyte battery according to claim 1, wherein the primary particles of the second composite oxide have an average particle size of 3 μm to 15 μm.

4. The nonaqueous electrolyte battery according to claim 1, wherein the positive electrode satisfies the following formula (I):

$$0.6 \leq I_1/I_2 \leq 7 \quad (I)$$

wherein $I_1$ is a peak intensity of a peak having the highest peak intensity in the range of 19° to 21° of an X-ray diffraction spectrum of the positive electrode according to powder X-ray diffractometry using a Cu-Kα ray and $I_2$ is a peak intensity of a peak having the highest peak intensity in the range of 43° to 46° of the X-ray diffraction spectrum.

5. The nonaqueous electrolyte battery according to claim 1, wherein the second composite oxide is represented by one of a general formula $LiCo_{1-a-b}Ni_aMn_bO_2$ ($0<a$, $b<0.2$) and a general formula $LiCoO_2$.

6. The nonaqueous electrolyte battery according to claim 1, wherein the lithium-containing composite oxide comprises at least one of spinel type lithium titanate represented by a general formula $Li_4Ti_5O_{12}$, a monoclinic beta-titanium composite oxide, a composite oxide represented by a general formula $Ti_{1-x}M_{x+y}Nb_{2-y}O_{7-\delta}$ ($0\leq x<1$, $0\leq y<1$, and M includes at least one element selected from the group consist of Mg, Fe, Ni, Co, W, Ta, and Mo), and a composite oxide represented by a general formula $Li_{2+v}Na_{2-w}M1_xTi_{6-y-z}Nb_yM2_zO_{14+\delta}$ ($0\leq v\leq 4$, $0<w<2$, $0\leq x<2$, $0<y\leq 6$, $0\leq z<3$, $-0.5\leq\delta\leq 0.5$, M1 includes at least one element selected from the group consisting of Cs, K, Sr, Ba, and Ca, and M2 includes at least one element selected from the group consisting of Zr, Sn, V, Ta, Mo, W, Fe, Co, Mn, and Al.

7. A battery pack comprising the nonaqueous electrolyte battery according to claim 1.

8. The nonaqueous electrolyte battery according to claim 1, wherein a content of the second composite oxide in the positive electrode active material is from 5% by weight to 30% by weight.

9. The battery pack according to claim 7, further comprising:
an external power distribution terminal; and
a protective circuit.

10. The battery pack according to claim 7, wherein:
the battery pack includes a plural of nonaqueous electrolyte battery; and
the nonaqueous electrolyte batteries are electrically connected in series, in parallel, or in combination of series and parallel.

11. A vehicle comprising the battery pack according to claim 7.

* * * * *